Aug. 18, 1931.  G. SCHILLO ET AL  1,819,443
AUTOMOBILE WINDSHIELD HEATER
Filed Jan. 31, 1930  2 Sheets-Sheet 1
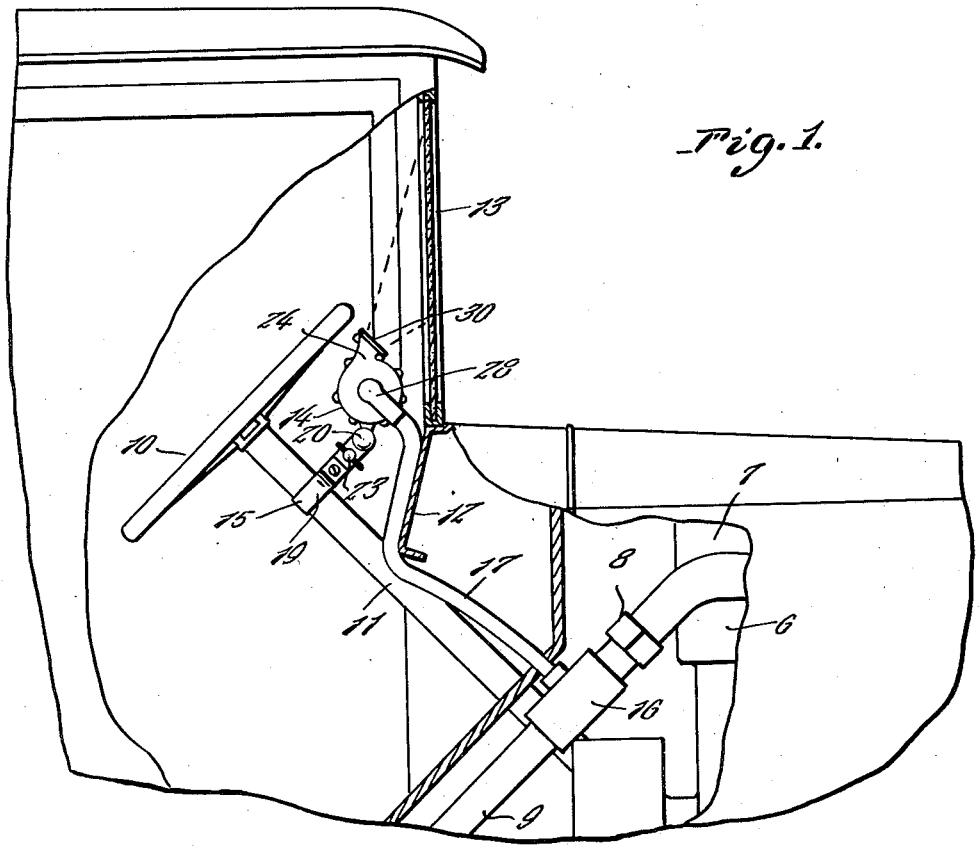
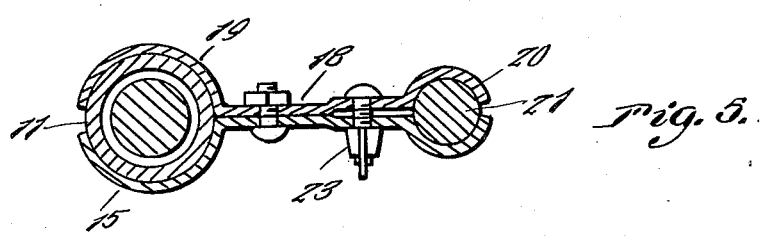
Inventors
George Schillo
Gust Plamann
By Clarence A. O'Brien
Attorney Aug. 18, 1931.  G. SCHILLO ET AL  1,819,443
AUTOMOBILE WINDSHIELD HEATER
Filed Jan. 31, 1930  2 Sheets-Sheet 2
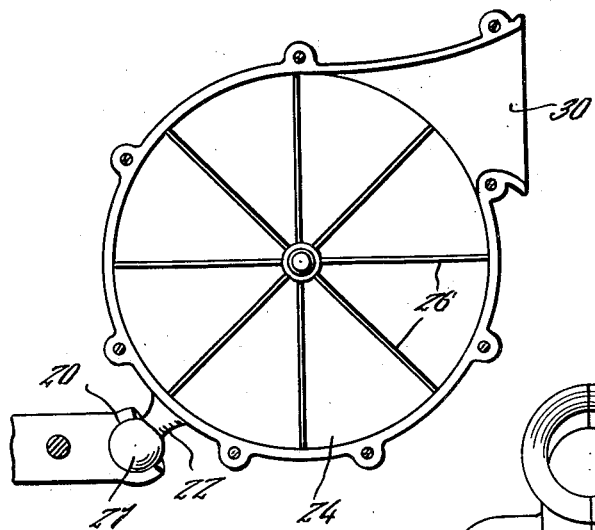
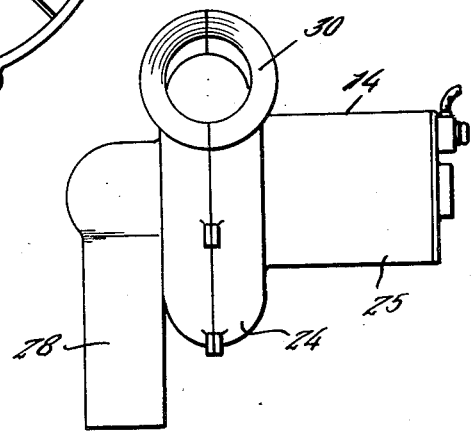
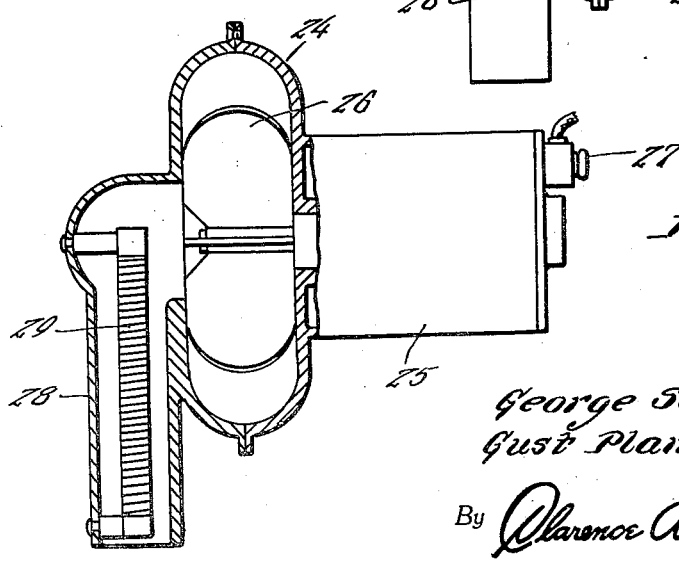
Inventors
George Schillo
Gust Plamann
By Clarence A. O'Brien
Attorney Patented Aug. 18, 1931

1,819,443

UNITED STATES PATENT OFFICE

GEORGE SCHILLO AND GUST PLAMANN, OF GAYLORD, MINNESOTA

AUTOMOBILE WINDSHIELD HEATER

Application filed January 31, 1930. Serial No. 425,033.

This invention relates to an appliance for use and association with the windshield of an automobile and the like, in the nature of a heated air blower constructed and arranged to deliver a current of heated air against the windshield to prevent collection of frost, snow or vapor thereon so that the vision of the vehicle driver will not be hindered.

One object of the invention is to provide an appliance for use on a windshield so that clear vision is assured through any portion of the windshield at all times.

Another object of the invention is to generally improve upon inventions of this general classification by providing a structure which is characterized by a novel arrangement of mechanical parts cooperating in producing a construction which will fulfill the requirements of an invention of this kind in a highly desirable manner.

In the drawings:

Figure 1 is an elevational view showing the appliance in position for use.

Figure 2 is a detail view of one half of the blower pipe.

Figure 3 is an elevational view of the complete blower including the electric motor.

Figure 4 is a view similar to Figure 3 with portions broken away and shown in section to disclose internal details.

Figure 5 is an exaggerated sectional view showing the attaching bracket.

Attention is first invited to Figure 1. Here the motor is designated by the numeral 6 and the exhaust manifold at 7, the union at 8, and the exhaust pipe at 9. The reference character 10 designates the steering wheel and 11 the steering column casing.

The instrument board is distinguished by the numeral 12, and the windshield is indicated at 13. The blower is generally designated by the numeral 14 and the attaching bracket by the numeral 15.

In accordance with the present invention, we provide a heating jacket 16. This is in the nature of a tube which surrounds the exhaust pipe 9 at a point rearward of the union 8. This is open at its opposite ends to allow atmospheric air to enter and be heated.

The heated air passes through a delivery tube or pipe 17 into the blower 14. The blower is mounted on the steering column casing through the medium of the bracket 15. The bracket is shown in Figure 5, and it comprises a pair of companion arms or strips 18 bolted together and including arcuate portions 19 forming a clamp which embraces the steering column casing.

The opposite ends are formed at at 20 to provide a socket for reception of the ball connector 21. This is formed on the mounting shank 22 of the blower housing. In addition, the reference character 23 designates a clamping bolt for adjusting the tension of the socket 20.

Referring now to Figures 2, 3 and 4, it will be seen that the blower comprises a casing or housing 24 composed of half sections bolted or otherwise fastened together. One of the half sections carries an electric motor 25 and the motor operates the internal suction fan 26. Incidently the motor switch is designated at 27.

The other half section of the casing includes an intake 28 in which an electric heating element 29 is located. The numeral 30 designates the peripheral bell-shaped discharge which assumes the relationship to the windshield represented in Fig. 1, to throw the blast of heated air against the inner surface of the windshield.

In practice, the atmospheric air is primarily heated by the exhaust pipe and is drawn into the jacket 16 by the suction produced in the line 17. The suction is developed by the rotation of the motor driven fan 26 in the aforesaid housing 24. As the primary heated air passes through the intake 28 it is superheated by the electric heating element 29.

The heated air enters the housing 24 and is blown out through the bell-like discharge or outlet 30. The blast of air is regulated to be discharged against the windshield 13 as designated in dotted lines in Figure 1.

The housing may be adjusted through the medium of the ball and socket joint already described.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

We claim:

In a structure of the class described in combination, a relatively thick standard, a bracket clamped thereon, an air heater and blower adjustably supported from said bracket and positioned in close proximity to a windshield, said air heater and blower comprising a fan housing, a fan mounted for rotation therein, a motor carried by said housing and operatively connected with said fan, a central air inlet on the opposite side of the housing, said inlet provided with an auxiliary heating element defining a secondary heater, a peripheral outlet directed toward the windshield, said inlet having associated therewith a primary delivery pipe and a preheating air jacket, said jacket adapted to surround an exhaust pipe.

In testimony whereof we affix our signatures.

GEORGE SCHILLO.
GUST PLAMANN.